US011674704B2

(12) United States Patent
Smirnova et al.

(10) Patent No.: US 11,674,704 B2
(45) Date of Patent: Jun. 13, 2023

(54) LOAD BALANCING WIRELESS MESH NETWORKS FOR HEATING, VENTILATION, AND AIR CONDITIONING SYSTEMS

(71) Applicant: Lennox Industries Inc., Richardson, TX (US)

(72) Inventors: Elena Smirnova, Plano, TX (US); Mansoor Ahmed, Parker, TX (US)

(73) Assignee: Lennox Industries Inc., Richardson, TX (US)

( * ) Notice: Subject to any disclaimer, the term of this patent is extended or adjusted under 35 U.S.C. 154(b) by 377 days.

(21) Appl. No.: 17/005,712

(22) Filed: Aug. 28, 2020

(65) Prior Publication Data

US 2022/0065483 A1    Mar. 3, 2022

(51) Int. Cl.
*F24F 11/58* (2018.01)
*F24F 11/30* (2018.01)
*H04W 24/02* (2009.01)
*H04W 84/12* (2009.01)
*H04W 84/18* (2009.01)

(52) U.S. Cl.
CPC .............. *F24F 11/58* (2018.01); *F24F 11/30* (2018.01); *H04W 24/02* (2013.01); *H04W 84/12* (2013.01); *H04W 84/18* (2013.01)

(58) Field of Classification Search
CPC .......... F24F 11/58; F24F 11/30; H04W 24/02; H04W 84/12; H04W 84/18; H04L 2012/2841; H04L 2012/285; H04L 12/2809
See application file for complete search history.

(56) References Cited

U.S. PATENT DOCUMENTS

2018/0172309 A1*  6/2018  Niikura ................... F24F 11/65

* cited by examiner

*Primary Examiner* — Charles R Kasenge
(74) *Attorney, Agent, or Firm* — Baker Botts L.L.P.

(57) ABSTRACT

A system that includes a plurality of controllers that are each controller is configured to operate at least a portion of includes a Heating, Ventilation, and Air Conditioning (HVAC) system. The system further includes a gateway controller that is configured to determine a mesh network size for a local mesh network, to broadcast the mesh network size to other gateway controllers within a local area network, and to receive mesh network size information from the other gateway controllers. The gateway controller is further configured to compute an average mesh network size for the local area network and to compare the mesh network size for the local mesh network to the average mesh network size. The gateway controller is further configured to modify the number of controllers within the local mesh network based on the comparison.

20 Claims, 6 Drawing Sheets

LOAD BALANCING WIRELESS MESH NETWORKS FOR HEATING, VENTILATION, AND AIR CONDITIONING SYSTEMS

TECHNICAL FIELD

The present disclosure relates generally to Heating, Ventilation, and Air Conditioning (HVAC) systems, and more specifically to load balancing wireless mesh networks for HVAC systems.

BACKGROUND

Providing connectivity to roof-top units (RTUs) of a Heating, Ventilation, and Air Conditioning (HVAC) system at a worksite can pose several technical challenges. For example, some worksites may employ hundreds or thousands of RTUs. The RTUs are configured to form mesh networks for a worksite. One of the technical challenges with forming a mesh network is controlling the size of the mesh network. Over-populated mesh networks result in poor connectivity between individual RTUs which degrade the performance of the entire network. In addition, the performance of a mesh network also degrades as the size of the mesh network increases. As the size of the mesh network increases, the number of hops for sending data within the mesh network increases which introduces latency that reduces the speed and throughput of the mesh network.

SUMMARY

The system disclosed in the present application provides a technical solution to the technical problems discussed above by load balancing to control the number of controllers that are members of a local mesh network. The disclosed system provides several practical applications and technical advantages which include a process for gateway controllers to release controllers from over-populated mesh networks and to add controllers to under-populated mesh networks. In some instances, a gateway controller load balances its local mesh networks by reducing the number of controllers within its local mesh network. This process improves the performance of the local mesh network by reducing the number of hops for sending data within the local mesh network which reduces latency and increases the speed and throughput of the local mesh network. In other instances, a gateway controller load balances its local mesh network by adding controllers that were released from other gateway controllers to its local mesh network. This process load balances the local area network by offloading some of the controllers from local mesh networks that are over-populated. The offloaded controllers are then connected to other local mesh networks that have some available capacity. This process improves the resource utilization of the local area network and provides more efficient data communications within the local area network.

In one embodiment, a Heating, Ventilation, and Air Conditioning (HVAC) network provisioning system includes one or more HVAC systems that are configured to control temperature within a space and a plurality of controllers that are each controller is configured to operate at least a portion of the HVAC system. A controller may be integrated with or configured to work with a roof-top unit (RTU) for the HVAC system. One or more of the controllers are configured as gateway controllers that are configured to form a local area network. Each gateway controller is configured to determine a mesh network size for its local mesh network and to broadcast the determined mesh network size to other gateway controllers within the local area network. The gateway controllers are further configured to receive mesh network size information from the other gateway controllers within the local area network and to compute an average mesh network size for the local area network based on the received mesh network size information. The gateway controllers are further configured to compare its mesh network size for the local mesh network to the average mesh network size for the local area network and to modify the number of controllers within its local mesh network based on the comparison between the mesh network size for the local mesh network to the average mesh network size for the local area network. The gateway controllers are further configured to release one or more controllers from its local mesh network when the local mesh network has more controllers than the average mesh network size. The gateway controllers are further configured to register one or more controllers to its local mesh network when the local mesh network has fewer controllers than the average mesh network size.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
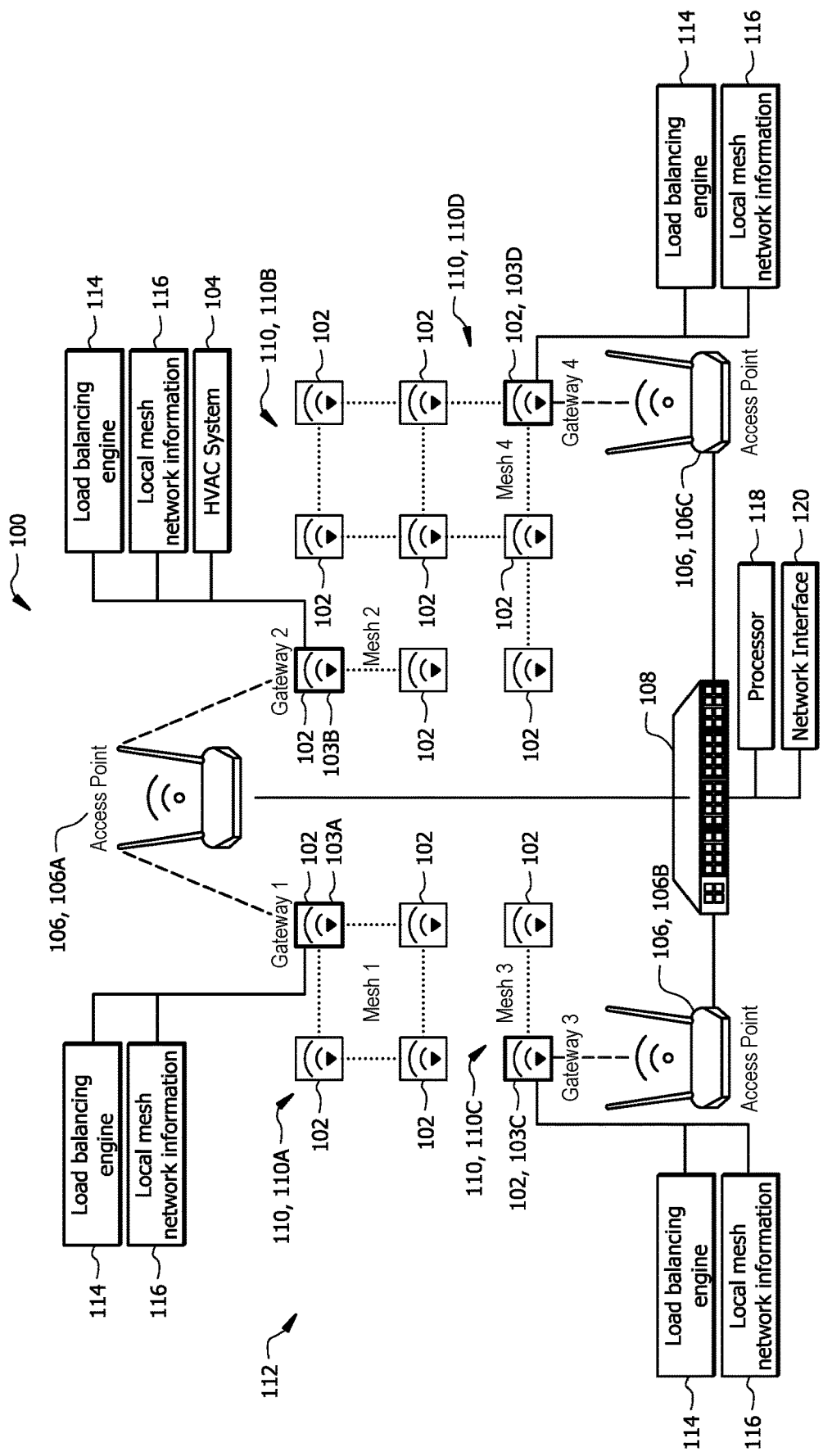
FIG. 1 is a schematic diagram of a wireless network system for heating, ventilation, and air conditioning (HVAC) systems.

FIG. 1 is a schematic diagram of a wireless network system 100 for heating, ventilation, and air conditioning (HVAC) systems 104. In one embodiment, the system 100 comprises one or more HVAC systems 104, one or more access points 106, a network switch 108, and a plurality of controllers 102. The one or more access points 106, the network switch 108, and the plurality of controllers 102 are in signal communication with each other via a network 112. The system 100 may be configured as shown or in any other suitable configuration.

The network 112 may be any suitable type of wireless and/or wired network including, but not limited to, all or portion of the Internet, an Intranet, a private network, a public network, a peer-to-peer network, the public switched telephone network, a cellular network, a local area network (LAN), a metropolitan area network (MAN), a wide area network (WAN), and a satellite network. The network connections may be configured to support any suitable type of communication protocol as would be appreciated by one of ordinary skill in the art.

HVAC System

An HVAC system 104 is generally configured to control the temperature of a space. Examples of a space include, but are not limited to, a room, a home, an apartment, a mall, an office, or a building. The HVAC system 104 may comprise a thermostat, compressors, blowers, evaporators, condensers, and/or any other suitable type of hardware for controlling the temperature of the space. An example of an HVAC system 104 configuration and its components is described below in FIG. 9. Although FIG. 1 illustrates a single HVAC system 104, a location or space may comprise a plurality of HVAC systems 104 that are configured to work together. For example, a large building may comprise multiple HVAC systems 104 that work cooperatively to control the temperature within the building.

Controllers

A controller 102 comprises a processor 650 is generally configured to control at least a portion of an HVAC system 104. The processor 650 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 650 may be a programmable logic device, a microcontroller, a microprocessor, or any suitable combination of the preceding. A controller 102 may be integrated within a portion of a roof-top unit (RTU) that is located on the roof of a building. Each controller 102 comprises a network interface 506 that enables the controller 102 to communicate with access points 106 and components of the HVAC system 104. For example, a controller 102 may be configured to establish a wireless connection (e.g. a WIFI connection) with other controllers 102 and access points 106. In other examples, a controller 102 may be configured to use any other suitable type of wired or wireless communication techniques to communicate with other devices in the system 100. Additional details about the configuration of the controller 102 are described in FIGS. 5 and 6.

One or more controllers 102 may be configured as gateway controllers 103. Typically, a gateway controller 103 is a controller 102 that is directly connected to an access point 106. Gateway controllers 103 are configured to form a provisioned local mesh network 110. A provisioned local mesh network 110 is a mesh network of controllers 102 that is associated with a local area network 112 for a location. When a set of controllers 102 are configured as a provisioned local mesh network 112, the controllers 102 are able to securely communicate with each other and other network devices (e.g. controllers 102) that are members of the local area network 112. The controllers 102 that are indirectly connected to the access point 106 via the gateway controller 103 may also be referred to as satellite controllers.

Each gateway controller 103 comprises local mesh network information 116 that comprises information about the controllers 102 that are in its local mesh network 110. For example, the local mesh network information 116 may comprise a mesh network identifier for a local mesh network 110 and controller identifiers for the controllers 102 that are members of the local mesh network 110. Examples of identifiers include, but are not limited to, Internet Protocol (IP) addresses, media access control (MAC) addresses, or any other suitable type of alphanumeric identifier that uniquely identifies a local mesh network 110 or a controller 102.

Figure 3:
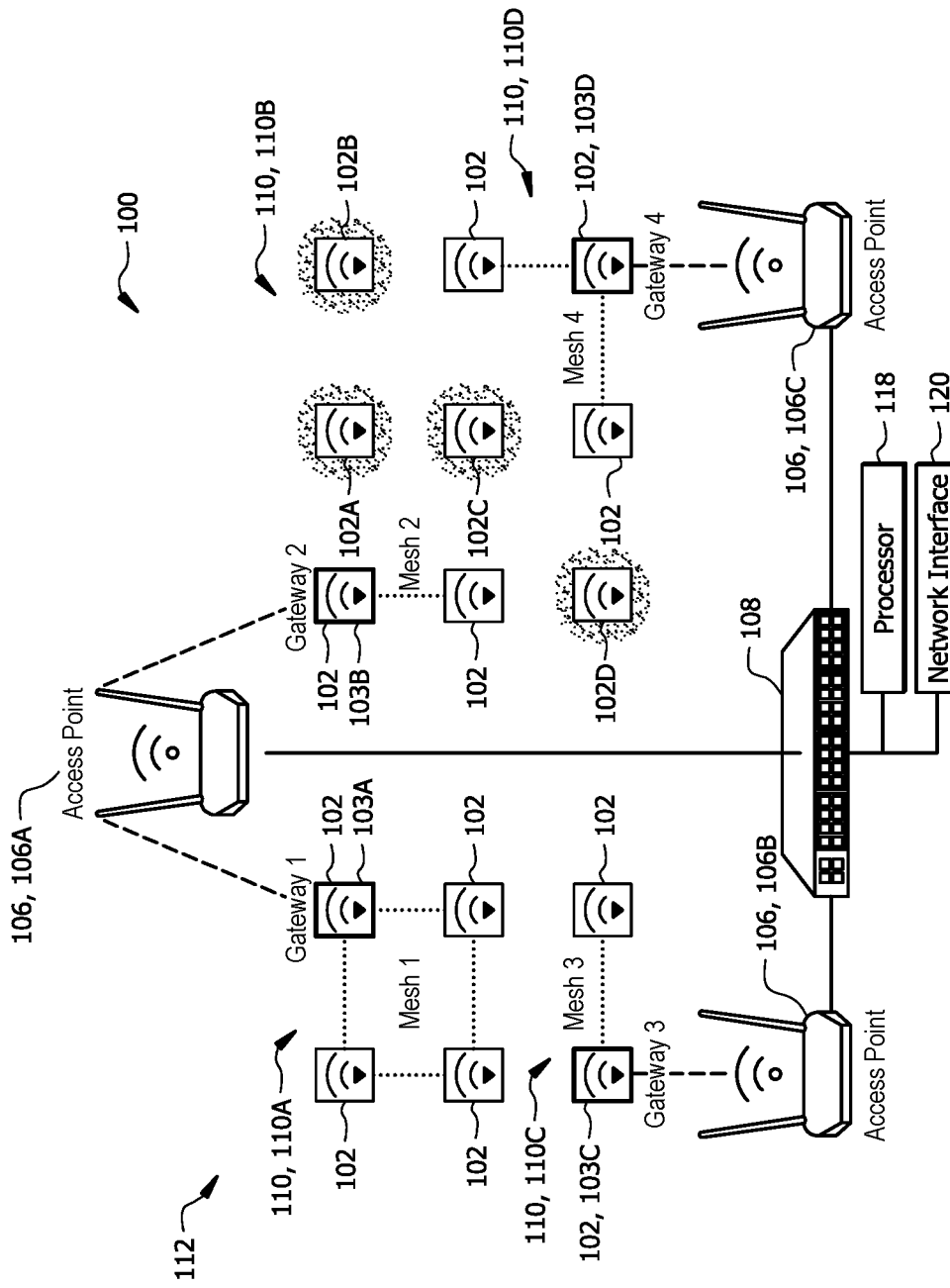
FIGS. 3-4 illustrate examples of the wireless mesh network load balancing process.
Figure 4:
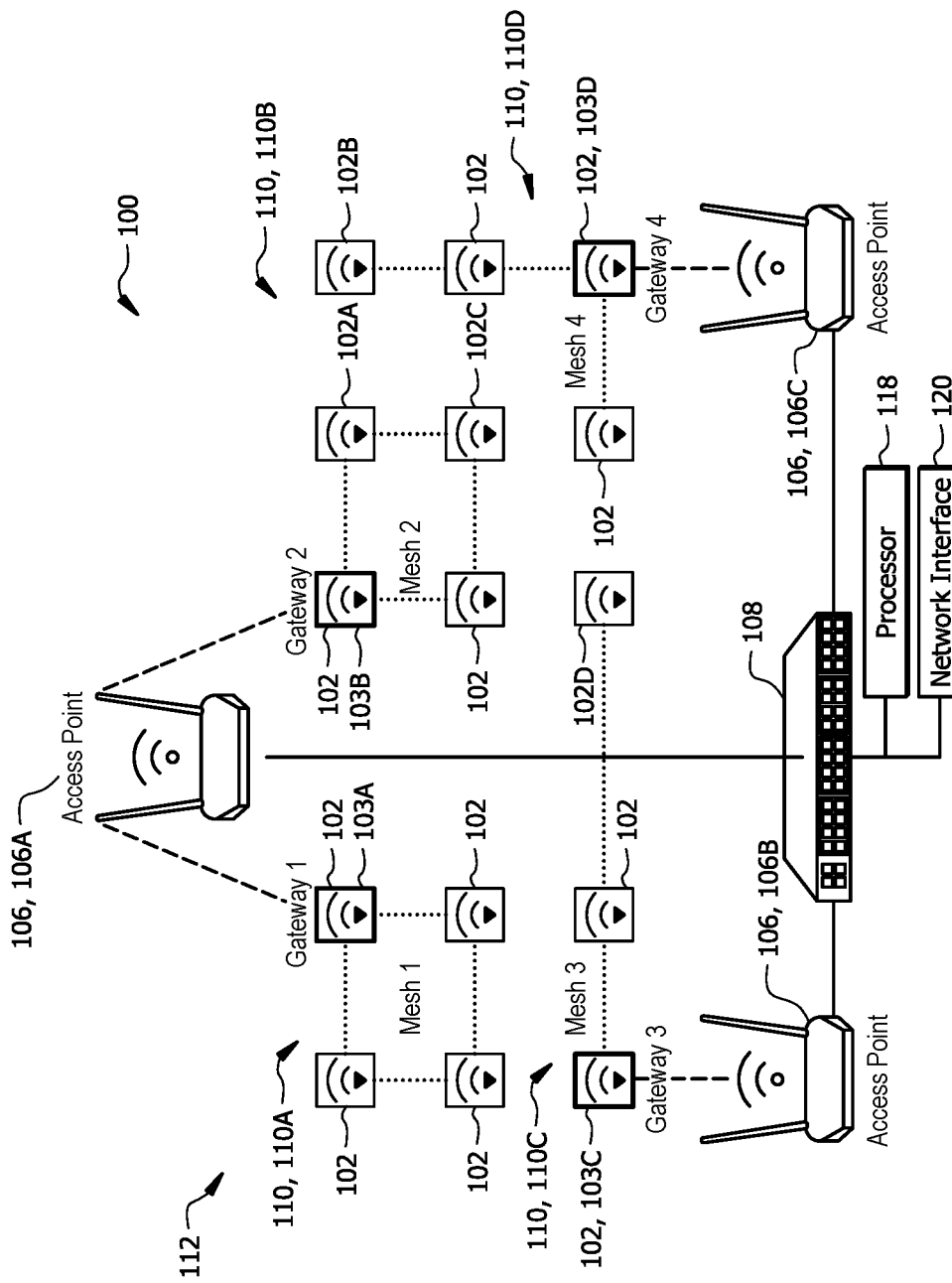

Each gateway controller 103 further comprises a load balancing engine 114 that is configured to provide load balancing for the local mesh networks 110 that are associated with a gateway controller 103. For example, the gateway controllers 103 are configured to add or release controllers 102 from their local mesh networks 110 to balance the number of controllers 102 that are connected to the gateway controller 103. An example of the gateway controllers 103 in operation is described in FIGS. 2-4. Additional information about the hardware configuration of the gateway controller 103 is described in FIG. 5.

Access Points

An example of an access point 106 is a wired or wireless modem or router. An access point 106 is generally configured to provide networking capabilities to the controllers 102 within its local mesh network 110. An access point 106 may also allow controllers 102 within its local mesh network 110 to communicate with controllers 102 in other local mesh networks 110 using a local area network 112. The access points 106 are distributed at a location (e.g. a worksite) to provide coverage for different parts of a building or space. Access points 106 are configured to communicate with each other via one or more network switches 108. An example of a network switch 108 includes, but is not limited to, a multiport network bridge that uses MAC addresses to forward data among the access points 106. Network switches 108 may comprise a processor 118, a network interface 120, and any other suitable type of hardware. The processor 118 is configured to route traffic between the access points 106. The network interface 120 is configured to communicate data between a network switch 108 and the access points 106.

An access point 106 may be configured to provide connectivity to one or more local mesh networks 110. Referring to the example in FIG. 1, a first access point 106A is configured to provide connectivity to a first local mesh network 110A and a second local mesh network 110B. A second access point 106B is configured to provide connectivity to a third local mesh network 110C. A third access point 106C is configured to provide connectivity to a fourth local mesh network 110D. The first local mesh network 110A, the second local mesh network 110B, the third local mesh network 110C, and the fourth local mesh network 110D combine to form a provisioned mesh network for the local area network 112. Each local mesh network 110 is associated with its own unique network identifier and network credentials for accessing the local mesh network 110.

Wireless Mesh Network Load Balancing Process

Figure 2:
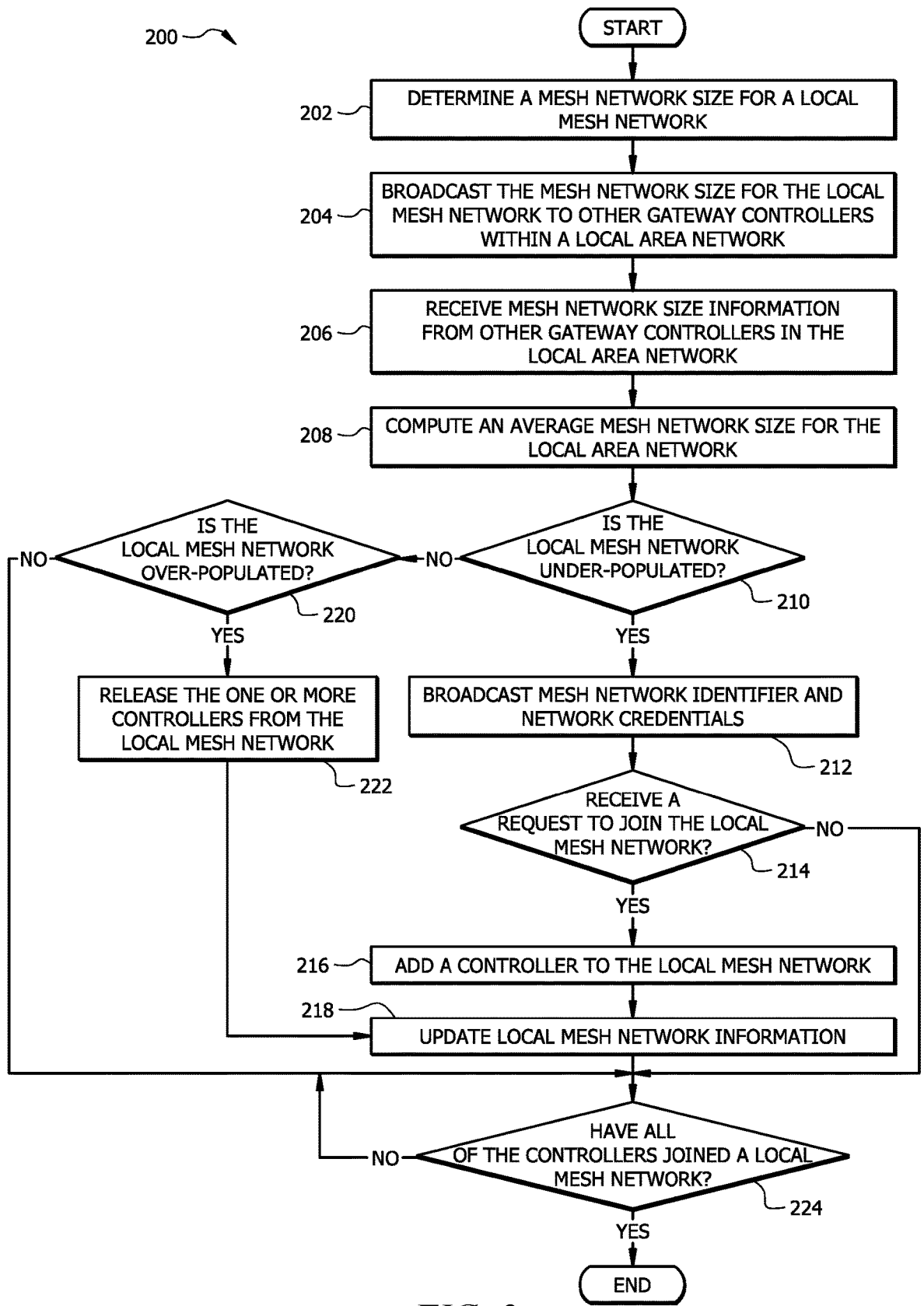
FIG. 2 is a flowchart of an embodiment of a wireless mesh network load balancing process.

FIG. 2 is a flowchart of an embodiment of a wireless mesh network load balancing process 200. A gateway controller 103 may employ process 200 to load balance the local mesh networks 110 within the local area network 112. In some instances, the gateway controller 103 load balances local mesh networks 110 by reducing the number of controllers 102 within its local mesh network 110. In other words, the gateway controller 103 may release one or more controllers 102 from its local mesh network 110 to improve the performance of the local mesh network 110. This process improves the performance of the local mesh network 110 by reducing the number of hops for sending data within the local mesh network 110 which reduces latency and increases the speed and throughput of the local mesh network 110. In other instances, the gateway controller 103 load balances by adding to its local mesh network 110 controllers 102 that were released from other gateway controllers 103. This process load balances the local area network 112 by offloading some of the controllers 102 from local mesh network 110 that are over-populated. The offloaded controllers 102 are then connected to other local mesh networks 110 that have some available capacity. This process improves the resource utilization of the local area network 112 and provides more efficient data communications within the local area network 112.

At step 202, a gateway controller 103 determines a mesh network size for a local mesh network 110 that is associated with the gateway controller 103. The mesh network size is the number of controllers 102 that are within a local mesh network 110 that is managed by the gateway controller 103. Referring to the example in FIG. 1, a gateway controller 103D determines the number of controllers 102 that are members of its local mesh network 110D. In this example, the gateway controller 103D determines that the local mesh network 110D has a mesh network size of seven controllers 102.

At step 204, the gateway controller 103 broadcasts the mesh network size for the local mesh network 110 to other gateway controllers 103 within a local access network 112. For example, the gateway controller 103 may broadcast the mesh network size for the local mesh network 110 to the other gateway controllers 103 via the network switch 108 using zero-configuration networking. In other examples, the gateway controller 103 may broadcast the mesh network size for the local mesh network 110 to the other gateway controllers 103 via the network switch 108 using any other suitable communication protocol. Continuing with the previous example, the gateway controller 103D will send a message to the other gateway controllers 103 (e.g. gateway controllers 103A, 103B, and 103C) that indicates the local mesh network 110D has a mesh network size of seven controllers 102.

At step 206, the gateway controller 103 receives mesh network size information of other gateway controllers 103 in the local area network 112. Continuing with the previous example, the gateway controller 103D receives mesh network size information from gateway controllers 103A, 103B, and 103C. In this example, the mesh network size information for the gateway controller 103A indicates that the gateway controller 103A is associated a local mesh network 110A that includes four controllers 102. The mesh network size information for the gateway controller 103B indicates that the gateway controller 103B is associated with a local mesh network 110B that includes two controllers 102. The mesh network size information for the gateway controller 103C indicates that the gateway controller 103C is associated with a local mesh network 110C that includes two controllers 102. Using the received mesh network size information, the gateway controller 103 can determine the total number of controllers 102 that are within the local area network 112. For example, the gateway controller 103 may compute the sum of the number of controllers 102 within all of the local mesh networks 110 of the gateway controllers 103. The gateway controller 103 may use the total number of controllers 102 that are within the local area network 112 later in step 224 to determine when load balancing has been completed.

At step 208, the gateway controller 103 computes an average mesh network size for the local area network 112. Here, the gateway controller 103 uses the mesh network size information from all of the other gateway controllers 103 to compute the average mesh network size for the local area network 112. Continuing with the previous example, the gateway controller 103D determines that the average mesh network size for the local area network 112 is about four controllers 102.

At step 210, the gateway controller 103 determines whether the local mesh network 110 under-populated. Here, the gateway controller 103 determines whether the number of controllers 102 in its local mesh network is less than the average number of controllers 102. When the number of controllers 102 in its local mesh network 110 is less than or equal to the average number of controllers 102, this means that the gateway controller 103 has the capacity to add additional controllers 102 to its local mesh network 110.

The gateway controller 103 proceeds to step 212 in response to determining that local mesh network 110 is under-populated. In this case, the gateway controller 103 determines that it has the capacity to add additional controllers 102 to its local mesh network 110. Returning to the example in FIG. 3, the gateway controller 103B is associated with a local mesh network 110B that is under-populated. The gateway controller 103C is also associated with a local mesh network 110C that is under-populated.

Returning to FIG. 2 at step 212, the gateway controller 103 broadcasts a mesh network identifier and network credentials. When the gateway controller 103 determines that it has the capacity to add additional controllers 102 to its local mesh network 110, the gateway controller 103 will broadcast its mesh network identifier and network credentials to the other gateway controllers 103 before they release any controllers 102 from the local mesh networks 110. This process allows the released controllers 102 to identify which local mesh networks 110 have available capacity and provides the controllers 102 with the network credentials for joining the local mesh network 110 that has available capacity. The released controllers 102 will send a request to join a local mesh network 110. The request to join may comprise the mesh network identifier, the network credentials, and/or any other suitable combination of information for joining the local mesh network 110 that has available capacity. In one embodiment, when a controller 102 is able to communicate with more than one local mesh network 110, the controller 102 may determine which local mesh network 110 has the strongest signal strength and may send a request to the local mesh network 110 that has the strongest signal strength with the controller 102.

At step 214, the gateway controller 103 determines whether a request to join the local mesh network 110 has been received. Here, the gateway controller 103 determines whether any of the released controllers 102 have sent a request to join its local mesh network 110. The gateway controller 103 terminates process 200 in response to determining that a request to join the local mesh network 110 has not been received. In this case, there are no controllers 102 requests to join the gateway controller's 103 local mesh network 110 which means that the gateway controller 103 will not be adding any additional controllers 102 to its local mesh network 110.

The gateway controller 103 proceeds to step 216 in response to determining that a request to join the local mesh network 110 has been received. In this case, there are one or more controllers 102 that would like to join the gateway controller's 103 local mesh network 110. At step 216, the gateway controller 103 registers one or more controllers 102 to its local mesh network 110. After authenticating the one or more controllers 102 using the network credentials, the gateway controller 103 will register the new controllers 102 to its local mesh network 110. Referring to the example in FIG. 4, the gateway controller 103B registers controllers 102A and 102C to its local mesh network 110B. The gateway controller 103C registers the controller 102D to its local mesh network 110C. The gateway controller 103D re-registers the controller 102B to its local mesh network 110D. In this example, the controller 102B may have a stronger signal strength connection with the local mesh network 110D than the local mesh network 110B which is why it sends a request to join the local mesh network 110D. In this example, after load balancing, the average number of controllers 102 within all of the local mesh networks 110 is about four. This process load balances the local area network 112 by offloading some of the controllers 102 from local mesh network 110 that are over-populated. The offloaded controllers 102 are then connected to other local mesh networks 110 that have some available capacity. This process improves the resource utilization of the local area network 112 and provides more efficient data communications within the local area network 112.

Returning to FIG. 2 at step 218, the gateway controller 103 updates the local mesh network information 116. Here, the gateway controller 103 updates the information about which controllers 102 are members of its local mesh network 110. For example, the gateway controller 103 may remove the identifiers for controllers 102 that were released from its local mesh network 110. The gateway controller 103 may also add identifiers for the controllers 102 that were added to its local mesh network 110. The gateway controller 103 may also update the total number of controllers 102 in its local mesh network 110.

Returning to step 210, the gateway controller 103 proceeds to step 220 in response to determining that the local mesh network 110 is not under-populated. In this case, the gateway controller 103 determines that the number of controllers 102 in its local mesh network 110 is greater than or equal to the average number of controllers 102. At step 220, the gateway controller 103 determines whether its local mesh network 110 is over-populated. Here, the gateway controller 103 compares the number of controllers 102 within its local mesh networks 110 to the average number of controllers 102 within other local mesh networks 110 to determine whether its local mesh network 110 is over-populated. In one embodiment, a local mesh network 110 is over-populated when the number of controllers 102 within a local mesh network 110 is greater than the average number of controllers 102 that in a local mesh network 110 that was computed in step 208. In some embodiments, a predetermined tolerance may be added to the average mesh network size before comparing the number of controllers 102 within its local mesh networks 110 to the average number of controllers 102 within other local mesh networks 110. For example, the predetermined tolerance may be equal to one which increases the average number of controllers 102 to five in the previous example. As another example, the threshold value may be based on the total number of controllers 102 or the average number of controllers 102 per local mesh network 110. In other examples, the threshold may be set to any other suitable value.

The gateway controller 103 proceeds to step 222 in response to determining that the local mesh network 110 is over-populated. Continuing with the previous example, the gateway controller 103D determines that its local mesh network 110, which has seven controllers 102, has more than the average number of controllers 102 and is over-populated. In one embodiment, the number of controllers 102 that a gateway controller 103 releases from its local mesh network 110 is equal to a difference between the number of controllers 102 within its local mesh network 110 and the average number of controllers 102 that is computed in step 208 plus the predetermined threshold. Referring to the example in FIG. 3, the average number of controllers 102 is four and the predetermined threshold is one. In this example, the gateway controller 103D will identify and release four controllers 102 from its local mesh network 110D. The gateway controller 103 may identify the four controllers 102 with the lowest signal strength to release from its local mesh network 110D. In this example, the gateway controller 103D will release controllers 102A, 102B, 102C, and 102D to the other gateway controllers 103 in the local area network 110.

Returning to FIG. 2 at step 222, the gateway controller 103 releases the one or more controllers 102 from the local mesh network 110. Continuing with the previous example, the gateway controller 103D will release controllers 102A, 102B, 102C, and 102D after determining the local mesh network 110 is over-populated. In one embodiment, the gateway controller 103 may release a controller 102 by sending instructions or commands to the controller 102 that triggers the controller 102 to leave the local mesh network 110. Before releasing the controllers 102, the gateway controller 103 may send mesh network identifiers and network credentials for local mesh networks 110 that have available capacity to the controller 102. This information allows the controllers 102 to identify which local mesh networks 110 have available capacity and provides the controllers 102 with the credentials to join one of the available local mesh networks 110.

In one embodiment, a controller 102 may test the signal strength with other gateway controllers 103 before releasing themselves from the local mesh network 110. In this case, the controller 102 checks whether the signal strength between the controller 102 and other gateway controllers 103 is sufficient for the controller 102 to join the local mesh network 110 of another gateway controller 103 before releasing itself from the local mesh network 110. The controller 102 may determine to not release itself from the local mesh network 110 when the signal strength between the controller 102 and other gateway controllers 103 is not sufficient for the controller 102 to join the local mesh network 110 of another gateway controller 103.

The gateway controller 103 load balances its local mesh network 110 by reducing the number of controllers 102 within its local mesh network 110. This process improves the performance of the local mesh network 110 by reducing the number of hops for sending data within the local mesh network 110 which reduces latency and increases the speed and throughput of the local mesh network 110. After the gateway controller 103 releases the one or more controllers 102 from the local mesh network 110, the gateway controller 103 proceeds to step 218 to update the local mesh network information 116.

At step 224, the gateway controller 103 determines whether all of the controllers 102 have joined a local mesh network 110. The gateway controllers 103 are configured to broadcast the mesh network size for their local mesh networks 110 to the other gateway controllers 103 within a local access network 112. Using the received mesh network size information, the gateway controller 103 determines the total number of controllers 102 that are being reported within the local area network 112. For example, the gateway controller 103 may compute the total number of controllers 102 using a process similar to the process that is described in step 206. The gateway controller 103 then compares the computed number of controllers 102 to the total number of controllers 102 that was determined in step 206. The gateway controller 103 determines that all of the controllers 102 have joined a local mesh network 110 when the computed number of controllers 102 is equal to the total number of controllers 102 that was determined in step 206. In other words, the gateway controller 103 determines that all of the controllers 102 have joined a local mesh network 110 when all of the controllers 102 have been accounted for by at least one of the gateway controllers 103.

In response to determining that the total number of controllers 102 does not match the total number of controllers 102 that was determined in step 206, the gateway controller 103 may wait for a predetermined amount of time for additional broadcasts from other gateway controllers 103 before recomputing the total number of controllers 102. In response to determining that the total number of controllers 102 matches the total number of controllers 102 that was determined in step 206, the gateway controller 103 may determine that load balancing the local mesh network 110 and the local area network 112 has been completed. After the gateway controller 103 load balances its local mesh network 110, the gateway controller 103 may terminate process 200 until the next scheduled time interval occurs to return to step 202 repeat the load balancing process for the local area network 112.

Hardware Configuration

Figure 5:
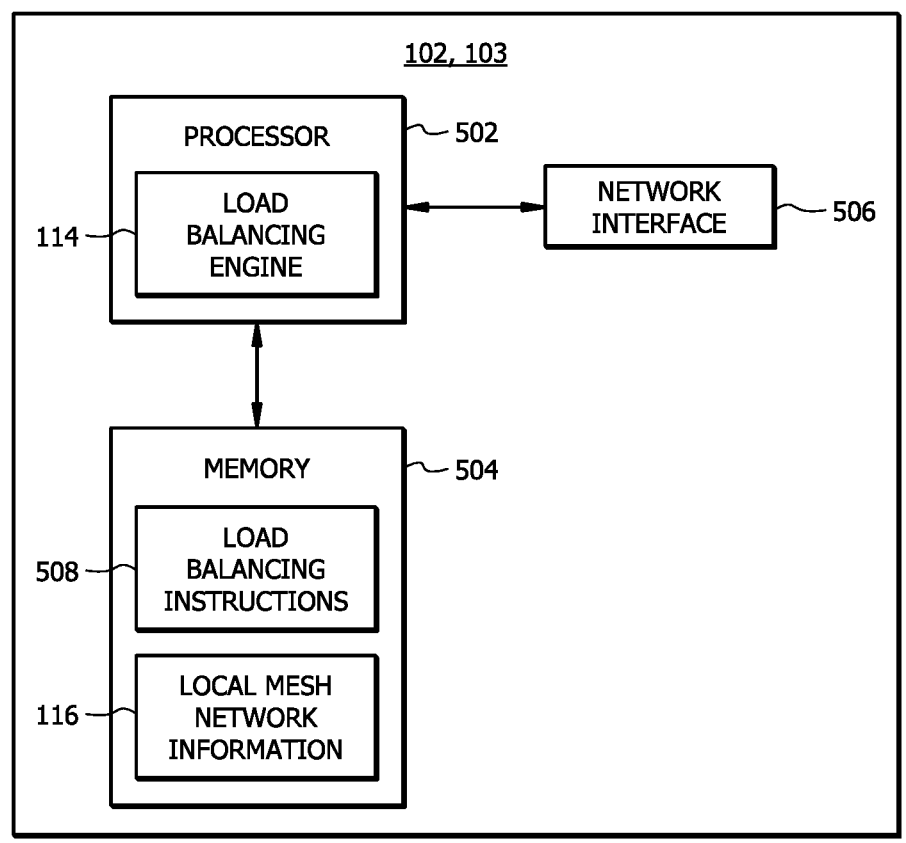
FIG. 5 is a schematic diagram of an embodiment of a device configured to load balance a wireless mesh network.

FIG. 5 is a schematic diagram of an embodiment of a device (e.g. a controller 102 or a gateway controller 103) configured to load balance a wireless mesh network for an HVAC system 104. In other embodiments, the device may be used to implement various components of system 100 illustrated in FIG. 1. For example, each of the controller 102, the access point 106, and the network switch 108 of FIG. 1 may be implemented using a corresponding device or a corresponding collection of devices. As an example, the gateway controller 103 comprises a processor 502, a memory 504, and a network interface 506. The gateway controller 103 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute load balancing instructions 508 to implement a load balancing engine 114. In this way, processor 502 may be a special-purpose computer designed to implement the functions disclosed herein. In an embodiment, the load balancing engine 114 is implemented using logic units, FPGAs, ASICs, DSPs, or any other suitable hardware. The load balancing engine 114 is configured to operate as described in FIGS. 1-4. For example, the load balancing engine 114 may be configured to perform the steps of process 200 as described in FIG. 2.

The memory 504 is operable to store any of the information described above with respect to FIGS. 1-4 along with any other data, instructions, logic, rules, or code operable to implement the function(s) described herein when executed by the processor 502. The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise a read-only memory (ROM), random-access memory (RAM), ternary content-addressable memory (TCAM), dynamic random-access memory (DRAM), and static random-access memory (SRAM).

The memory 504 is operable to store load balancing instructions 508, local mesh network information 116, and/or any other data or instructions. The load balancing instructions 508 may comprise any suitable set of instructions, logic, rules, or code operable to execute the load balancing engine 114. The local mesh network information 116 is configured similar to the local mesh network information 116 described in FIGS. 1-4.

The network interface 506 is configured to enable wired and/or wireless communications. The network interface 506 is configured to communicate data between the access point 106 and other devices (e.g. controllers 102, switches 108, and other access points 106), systems, or domains. For example, the network interface 506 may comprise a near-field communication (NFC) interface, a Bluetooth interface, Zigbee interface, a Z-wave interface, a Radio-Frequency Identification (RFID) interface, a WIFI interface, a LAN interface, a WAN interface, a modem, a switch, or a router. The processor 502 is configured to send and receive data using the network interface 506. The network interface 506 may be configured to use any suitable type of communication protocol as would be appreciated by one of ordinary skill in the art.

HVAC System Configuration

Figure 6:
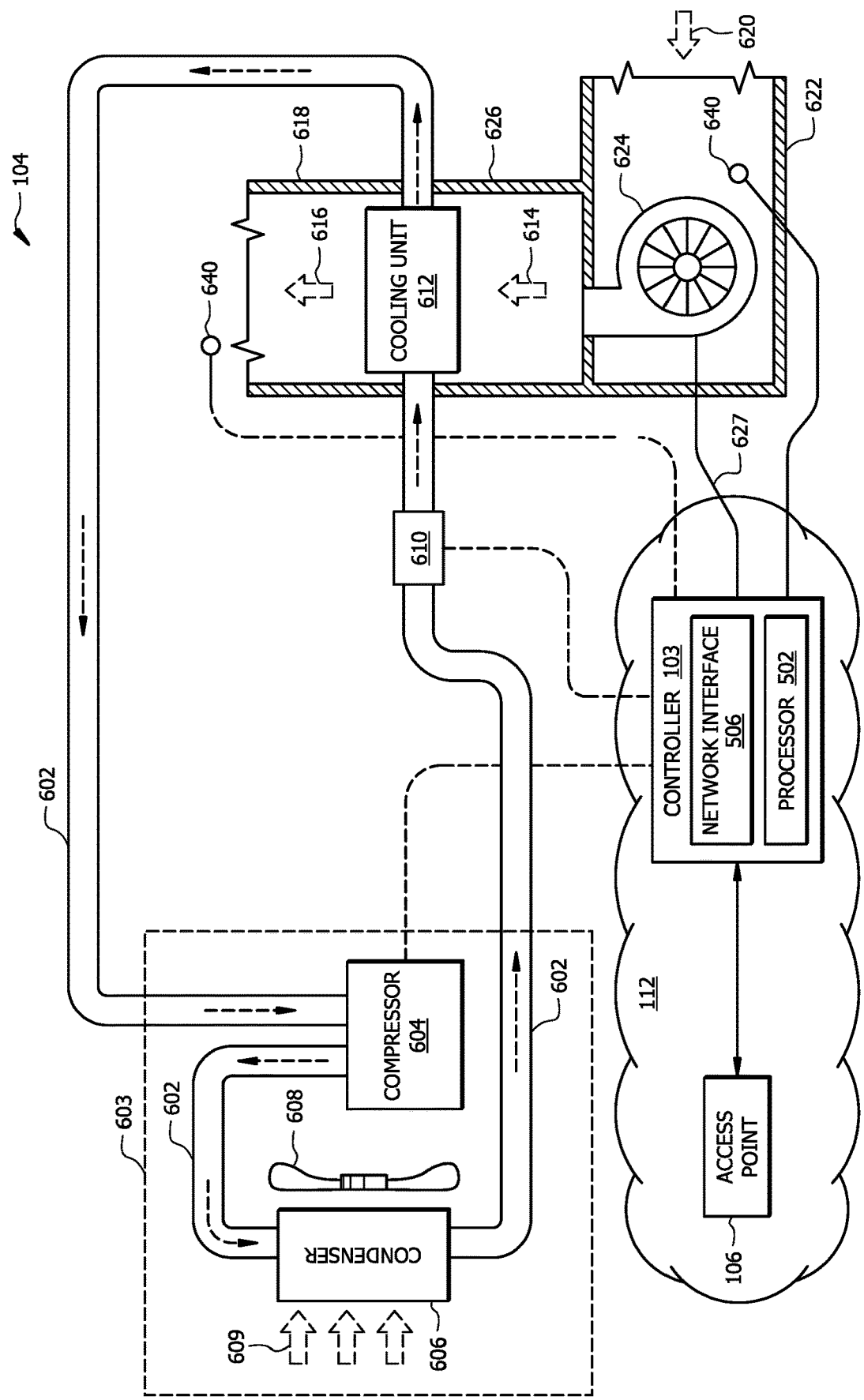
FIG. 6 is a schematic diagram of an embodiment of an HVAC system configured to integrate with a provisioned wireless mesh network.

FIG. 6 is a schematic diagram of an embodiment of an HVAC system 104 configured to integrate with a provisioned wireless mesh network 112. The HVAC system 104 conditions air for delivery to an interior space of a building. In some embodiments, the HVAC system 104 is a rooftop unit (RTU) that is positioned on the roof of a building and the conditioned air is delivered to the interior of the building. In other embodiments, portions of the system may be located within the building and a portion outside the building. The HVAC system 104 may also include heating elements that are not shown here for convenience and clarity. The HVAC system 104 may be configured as shown in FIG. 6 or in any other suitable configuration. For example, the HVAC system 104 may include additional components or may omit one or more components shown in FIG. 6.

The HVAC system 104 comprises a working-fluid conduit subsystem 602 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydrofluorocarbons (e.g. R-410A), or any other suitable type of refrigerant.

The HVAC system 104 comprises one or more condensing units 603. In one embodiment, the condensing unit 603 comprises a compressor 604, a condenser coil 606, and a fan 608. The compressor 604 is coupled to the working-fluid conduit subsystem 602 that compresses the working fluid. The condensing unit 603 may be configured with a single-stage or multi-stage compressor 604. A single-stage compressor 604 is configured to operate at a constant speed to increase the pressure of the working fluid to keep the working fluid moving along the working-fluid conduit subsystem 602. A multi-stage compressor 604 comprises multiple compressors configured to operate at a constant speed to increase the pressure of the working fluid to keep the working fluid moving along the working-fluid conduit subsystem 602. In this configuration, one or more compressors can be turned on or off to adjust the cooling capacity of the HVAC system 104. In some embodiments, a compressor 604 may be configured to operate at multiple speeds or as a variable speed compressor. For example, the compressor 604 may be configured to operate at multiple predetermined speeds.

In one embodiment, the condensing unit 603 (e.g. the compressor 604) is in signal communication with a controller 102 using a wired or wireless connection. The controller 102 is configured to provide commands or signals to control the operation of the compressor 604. For example, the controller 102 is configured to send signals to turn on or off one or more compressors 604 when the condensing unit 603 comprises a multi-stage compressor 604. In this configuration, the controller 102 may operate the multi-stage compressors 604 in a first mode where all the compressors 604 are on and a second mode where at least one of the compressors 604 is off. In some examples, the controller 102 may be configured to control the speed of the compressor 604.

The condenser 606 is configured to assist with moving the working fluid through the working-fluid conduit subsystem 602. The condenser 606 is located downstream of the compressor 604 for rejecting heat. The fan 608 is configured to move air 609 across the condenser 606. For example, the fan 608 may be configured to blow outside air through the heat exchanger to help cool the working fluid. The compressed, cooled working fluid flows downstream from the condenser 606 to an expansion device 610, or metering device.

The expansion device 610 is configured to remove pressure from the working fluid. The expansion device 610 is coupled to the working-fluid conduit subsystem 602 downstream of the condenser 606. The expansion device 610 is closely associated with a cooling unit 612 (e.g. an evaporator coil). The expansion device 610 is coupled to the working-fluid conduit subsystem 602 downstream of the condenser 606 for removing pressure from the working fluid. In this way, the working fluid is delivered to the cooling unit 612 and receives heat from airflow 614 to produce a treated airflow 616 that is delivered by a duct subsystem 618 to the desired space, for example, a room in the building.

A portion of the HVAC system 104 is configured to move air across the cooling unit 612 and out of the duct subsystem 618. Return air 620, which may be air returning from the building, fresh air from outside, or some combination, is pulled into a return duct 622. A suction side of a variable-speed blower 624 pulls the return air 620. The variable-speed blower 624 discharges airflow 614 into a duct 626 from where the airflow 614 crosses the cooling unit 612 or heating elements (not shown) to produce the treated airflow 616.

Examples of a variable-speed blower 624 include, but are not limited to, belt-drive blowers controlled by inverters, direct-drive blowers with electronically commutated motors (ECM), or any other suitable types of blowers. In some configurations, the variable-speed blower 624 is configured to operate at multiple predetermined fan speeds. In other configurations, the fan speed of the variable-speed blower 624 can vary dynamically based on a corresponding temperature value instead of relying on using predetermined fan speeds. In other words, the variable-speed blower 624 may be configured to dynamically adjust its fan speed over a range of fan speeds rather than using a set of predetermined fan speeds. This feature also allows the controller 102 to gradually transition the speed of the variable-speed blower 624 between different operating speeds. This contrasts with conventional configurations where a variable-speed blower 624 is abruptly switched between different predetermined fan speeds. The variable-speed blower 624 is in signal communication with the controller 102 using any suitable type of wired or wireless connection 627. The controller 102 is configured to provide commands or signals to the variable-speed blower 624 to control the operation of the variable-speed blower 624. For example, the controller 102 is configured to send signals to the variable-speed blower 624 to control the fan speed of the variable-speed blower 624. In some embodiments, the controller 102 may be configured to send other commands or signals to the variable-speed blower 624 to control any other functionality of the variable-speed blower 624.

The HVAC system 104 comprises one or more sensors 640 in signal communication with the controller 102. The sensors 640 may comprise any suitable type of sensor for measuring air temperature. The sensors 640 may be positioned anywhere within a conditioned space (e.g. a room or building) and/or the HVAC system 104. For example, the HVAC system 104 may comprise a sensor 640 positioned and configured to measure an outdoor air temperature. As another example, the HVAC system 104 may comprise a sensor 640 positioned and configured to measure a supply or treated air temperature and/or a return air temperature. In other examples, the HVAC system 104 may comprise sensors 640 positioned and configured to measure any other suitable type of air temperature.

The HVAC system 104 comprises one or more thermostats, for example located within a conditioned space (e.g. a room or building). A thermostat may be a single-stage thermostat, a multi-stage thermostat, or any suitable type of thermostat as would be appreciated by one of ordinary skill in the art. The thermostat is configured to allow a user to input a desired temperature or temperature set point for a designated space or zone such as the room. The controller 102 may use information from the thermostat such as the temperature set point for controlling the compressor 604 and the variable-speed blower 624. The thermostat is in signal communication with the controller 102 using any suitable type of wired or wireless communications. In some embodiments, the thermostat may be integrated with the controller 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A Heating, Ventilation, and Air Conditioning (HVAC) network provisioning system, comprising:
a plurality of controllers, wherein:
each controller is configured to operate at least a portion of an HVAC system; and
one or more of the plurality of controllers are configured as a gateway controller that comprises:
a network interface configured to:
communicate directly with an access point;
communicate with one or more other gateway controllers within a local area network; and
communicate with controllers within a local mesh network; and
a processor operably coupled to the network interface, configured to:
determine a mesh network size for the local mesh network, wherein the mesh network size indicates a number of controllers that are members of the local mesh network;
broadcast the determined mesh network size to other gateway controllers within the local area network;
receive mesh network size information from the other gateway controllers within the local area network;
compute an average mesh network size for the local area network based on the received mesh network size information;
compare the mesh network size for the local mesh network to the average mesh network size for the local area network; and
modify the number of controllers within the local mesh network based on the comparison between the mesh network size for the local mesh network to the average mesh network size for the local area network.

2. The system of claim 1, wherein modifying the number of controllers within the local mesh network comprises:
receiving a mesh network identifier and network credentials for a different local mesh network;
sending the mesh network identifier and the network credentials to one or more controllers from the local mesh network in response to determining that the number of controllers within the local mesh network is greater than the average mesh network size for the local area network; and
releasing the one or more controllers from the local mesh network.

3. The system of claim 2, wherein the processor is further configured to determine the one or more controllers have the lowest signal strength from among the controllers within the local mesh network before broadcasting the identifiers for the one or more controllers.

4. The system of claim 1, wherein modifying the number of controllers within the local mesh network comprises broadcasting a mesh network identifier and network credentials to the other gateway controllers within the local area network in response to determining that the number of controllers within the local mesh network is less than the average mesh network size for the local area network.

5. The system of claim 4, wherein the processor is further configured to:
receive a request to join the local mesh network from a controller via the local mesh network in response to broadcasting the mesh network identifier and the network credentials, wherein the request comprises the mesh network identifier and the network credentials; and
add the controller to the local mesh network.

6. The system of claim 1, wherein the processor is further configured to update local mesh network information based on the number of controllers within the local mesh network after modifying the number of controllers within the local mesh network.

7. The system of claim 1, wherein broadcasting the determined mesh network size to the gateway controllers within the local area network occurs at predetermined time intervals.

8. A load balancing method, comprising:
determining a mesh network size for a local mesh network, wherein:
the mesh network size indicates a number of controllers that are members of the local mesh network;
each controller is configured to operate at least a portion of an HVAC system; and
the HVAC system configured to control a temperature within a space;
broadcasting the determined mesh network size to gateway controllers within a local area network;
receiving mesh network size information from the gateway controllers within the local area network;
computing an average mesh network size for the local area network based on the received mesh network size information;
comparing the mesh network size for the local mesh network to the average mesh network size for the local area network; and
modifying the number of controllers within the local mesh network based on the comparison between the mesh network size for the local mesh network to the average mesh network size for the local area network.

9. The method of claim 8, wherein modifying the number of controllers within the local mesh network comprises:
receiving a mesh network identifier and network credentials for a different local mesh network;
sending the mesh network identifier and the network credentials to one or more controllers from the local mesh network in response to determining that the number of controllers within the local mesh network is greater than the average mesh network size for the local area network; and
releasing the one or more controllers from the local mesh network.

10. The method of claim 9, further comprising determining the one or more controllers have the lowest signal strength from among the controllers within the local mesh network before broadcasting the identifiers for the one or more controllers.

11. The method of claim 8, wherein modifying the number of controllers within the local mesh network comprises broadcasting a mesh network identifier and network credentials to the gateway controllers within the local area network in response to determining that the number of controllers within the local mesh network is less than the average mesh network size for the local area network.

12. The method of claim 11, further comprising:
receiving a request to join the local mesh network from a controller via the local mesh network in response to broadcasting the mesh network identifier and the network credentials, wherein the request comprises the mesh network identifier and the network credentials; and
adding the controller to the local mesh network.

13. The method of claim 8, further comprising updating local mesh network information based on the number of controllers within the local mesh network after modifying the number of controllers within the local mesh network.

14. The method of claim 8, wherein broadcasting the determined mesh network size to the gateway controllers within the local area network occurs at predetermined time intervals.

15. A non-transitory computer readable medium storing instructions that when executed by a processor cause the processor to:
determine a mesh network size for a local mesh network, wherein:
the mesh network size indicates a number of controllers that are members of the local mesh network;
each controller is configured to operate at least a portion of an HVAC system; and
the HVAC system configured to control a temperature within a space;
broadcast the determined mesh network size to gateway controllers within a local area network;
receive mesh network size information from the gateway controllers within the local area network;
compute an average mesh network size for the local area network based on the received mesh network size information;
compare the mesh network size for the local mesh network to the average mesh network size for the local area network; and
modify the number of controllers within the local mesh network based on the comparison between the mesh network size for the local mesh network to the average mesh network size for the local area network.

16. The non-transitory computer readable medium of claim 15, wherein modifying the number of controllers within the local mesh network comprises:
receiving a mesh network identifier and network credentials for a different local mesh network;
sending the mesh network identifier and the network credentials to one or more controllers from the local mesh network in response to determining that the number of controllers within the local mesh network is greater than the average mesh network size for the local area network; and
releasing the one or more controllers from the local mesh network.

17. The non-transitory computer readable medium of claim 16, wherein the instructions further cause the processor to determine the one or more controllers have the lowest signal strength from among the controllers within the local mesh network before broadcasting the identifiers for the one or more controllers.

18. The non-transitory computer readable medium of claim 15, wherein modifying the number of controllers within the local mesh network comprises broadcasting a mesh network identifier and network credentials to the gateway controllers within the local area network in response to determining that the number of controllers within the local mesh network is less than the average mesh network size for the local area network.

19. The non-transitory computer readable medium of claim 18, wherein the instructions further cause the processor to:
receiving a request to join the local mesh network from a controller via the local mesh network in response to broadcasting the mesh network identifier and the network credentials; and
adding the controller to the local mesh network.

20. The non-transitory computer readable medium of claim 15, wherein the instructions further cause the processor to update local mesh network information based on the number of controllers within the local mesh network after modifying the number of controllers within the local mesh network.

* * * * *